(12) United States Patent
Lisso (10) Patent No.: US 11,738,949 B2
(45) Date of Patent: Aug. 29, 2023

(54) ORDER FULFILLMENT SYSTEMS AND METHODS

(71) Applicant: Target Brands, Inc., Minneapolis, MN (US)

(72) Inventor: Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 47 days.

(21) Appl. No.: 17/573,165

(22) Filed: Jan. 11, 2022

(65) Prior Publication Data

US 2022/0135331 A1    May 5, 2022

Related U.S. Application Data

(63) Continuation of application No. 16/519,259, filed on Jul. 23, 2019, now Pat. No. 11,247,843.

(60) Provisional application No. 62/722,581, filed on Aug. 24, 2018.

(51) Int. Cl.
| | |
|---|---|
| *G06F 7/00* | (2006.01) |
| *B65G 1/137* | (2006.01) |
| *B25J 9/16* | (2006.01) |
| *G06Q 10/087* | (2023.01) |

(52) U.S. Cl.
CPC ............ *B65G 1/1373* (2013.01); *B25J 9/162* (2013.01); *B25J 9/1679* (2013.01); *G06Q 10/087* (2013.01)

(58) Field of Classification Search
CPC ...... B65G 1/1373; B65G 1/1378; B25J 9/162; B25J 9/1679; G06Q 10/087

USPC ......................................... 700/213–216, 228
See application file for complete search history.

(56) References Cited

U.S. PATENT DOCUMENTS

| | | |
|---|---|---|
| 10,026,044 B1 | 7/2018 | Wurman |
| 10,278,095 B1 | 4/2019 | Kothari |
| 2008/0181753 A1* | 7/2008 | Bastian ............... B65G 1/1376 414/277 |
| 2016/0129587 A1 | 5/2016 | Lindbo et al. |
| 2016/0355337 A1 | 12/2016 | Lert et al. |
| 2017/0066592 A1 | 3/2017 | Bastian et al. |
| 2017/0140327 A1 | 5/2017 | Lindbo |
| 2017/0174431 A1 | 6/2017 | Borders et al. |
| 2017/0267452 A1 | 9/2017 | Goren |

OTHER PUBLICATIONS

JD.com. Inc. [online], "JD.com's vision for the smart logistics center of the future," Sep. 26, 2016, [retrieved on Jul. 22, 2019], retrieved from: URL<https://www.youtube.com/watch?v=udRYxhS4-Ow>, 1 page (Video Submission).

(Continued)

*Primary Examiner* — Yolanda R Cumbess
(74) *Attorney, Agent, or Firm* — Fish & Richardson P.C.

(57) ABSTRACT

Warehouse automation and methods of controlling material flow can be used to streamline order fulfillment processes. For example, according to some embodiments described herein, the inventory capacity of a mobile robot field is enhanced by vertically expanding the storage space that is readily accessible by mobile robots that facilitate an order sortation process. In result, the handling of inventoried items is reduced, and the efficiency of order fulfillment processes is increased.

20 Claims, 3 Drawing Sheets

(56) References Cited

OTHER PUBLICATIONS

Warehouselogistics [online], "Automated Guided Vehicles, Storage and Retrieval Machines, 2XL N.V., Warehouse Automation," Jul. 28, 2015, [retrieved on Jul. 22, 2019], retrieved from: URL <https://www.youtube.com/watch?v=S8zDRu72HD0>, 1 page (Video Submission).

* cited by examiner

ORDER FULFILLMENT SYSTEMS AND METHODS

CROSS-REFERENCE TO RELATED APPLICATIONS

This application is a continuation of U.S. utility application Ser. No. 16/519,259, filed Jul. 23, 2019, which claims the benefit of U.S. Provisional Application Ser. No. 62/722,581, filed Aug. 24, 2018. The disclosure of the prior application is considered part of (and is incorporated by reference in) the disclosure of this application.

This document relates to systems and methods for enhancing efficiencies of order fulfillment processes. For example, this document relates to systems and methods for enhancing the amount of inventory held in storage that is readily accessible by mobile robots in order to streamline order fulfillment processes.

BACKGROUND

Highly efficient warehousing, item picking, order sortation, and shipping processes are on the frontline of meeting high-level customer expectations regarding order fulfillment processes.

The order fulfillment process refers to all the steps companies take from when they receive a customer order (which can include an order that is wholly or partly internal to the company, such as a store replenishment order) until the items are landed in customers' or recipients' hands. Such steps can include, for example: the order is sent to the warehouse; a worker goes into the warehouse, finds the items in the order, and picks the items off the shelf; the order is packed for shipping; the order is shipped.

The use of warehouse automation is one way to increase the efficiency of an order fulfillment process. The goal of automation is to cut out manual steps of the order fulfillment process. Automation technology is useful for at least two reasons: to help reduce the occurrences of human error, and to make order fulfillment processes more efficient.

SUMMARY

This document describes systems and methods for enhancing efficiencies of order fulfillment processes. For example, this document describes systems and methods for enhancing the amount of inventory held in storage that is readily accessible by mobile robots in order to streamline order fulfillment processes. In result, the handling of inventoried items is reduced, and the efficiency of order fulfillment processes is increased using the systems and methods described herein.

In one aspect, this disclosure is directed to an order fulfillment system that includes: (i) a plurality of static storage units consolidated in an area, each static storage unit defining multiple storage locations, each storage location configured to receive and store a sellable unit container; (ii) a plurality of robotic actuators, each robotic actuator arranged and operable to access the multiple storage locations of one or more of the static storage units; (iii) a plurality of mobile robots, each mobile robot configured to receive and transport a sellable unit container; and (iv) a control system. The control system is operable, in response to receiving an order that includes demand for a first sellable unit, to: (a) cause a first robotic actuator to access a first storage location of a first static storage unit and to couple with a first sellable unit container stored in the first storage location, wherein the first sellable unit container contains one or more of the first sellable units; (b) cause the first robotic actuator to place the first sellable unit container into engagement with a first mobile robot; and (c) cause the first mobile robot to transport the first sellable unit container to an order processing area.

Such an order fulfillment system may optionally include one or more of the following features. The static storage units may be or include racks or shelves with multiple vertical levels. One or more of the robotic actuators may be suspended from a respective rail and traverse along the respective rail. One or more of the robotic actuators may be mounted to a floor and traverse along the floor. The order also may include demand for a second sellable unit, and the control system may also be operable, in response to receiving the order, to: (1) cause a second robotic actuator to access a second storage location of a second static storage unit and to couple with a second sellable unit container stored in the second storage location, wherein the second sellable unit container contains one or more of the second sellable units; (2) cause the second robotic actuator to place the second sellable unit container into engagement with a second mobile robot; and (3) cause the second mobile robot to transport the second sellable unit container to the order processing area. The control system may be also operable, in response to receiving the order, to output instructions to transfer at least one of the first sellable units into an outbound container and to transfer at least one of the second sellable units into the outbound container. The control system may also be operable to determine a particular sequence in which multiple ones of the mobile robots are staged at the order processing area. The particular sequence may be based on an efficient technique for stocking shelves of a retail store.

In another aspect, this disclosure is directed to a method for responding to an order that includes a first sellable unit. The method can be executed by a control system in response to receiving the order and include: (i) causing a first robotic actuator to access a first storage location of a first static storage unit and to couple with a first sellable unit container stored in the first storage location, wherein the first sellable unit container contains one or more of the first sellable units; (ii) causing the first robotic actuator to transfer the first sellable unit container into engagement with a first mobile robot; and (iii) causing the first mobile robot to transport the first sellable unit container to an order processing area.

Such a method may optionally include one or more of the following features. The order may also include a second sellable unit that differs from the first sellable unit, and the method may also include: (a) causing a second robotic actuator to access a second storage location of a second static storage unit and to couple with a second sellable unit container stored in the second storage location, wherein the second sellable unit container contains one or more of the second sellable units; (b) causing the second robotic actuator to transfer the second sellable unit container into engagement with a second mobile robot; and (c) causing the second mobile robot to transport the second sellable unit container to the order processing area. The method may also include outputting instructions to transfer at least one of the first sellable units into an outbound container and to transfer at least one of the second sellable units into the outbound container. The method may also include causing the first mobile robot and a plurality of other mobile robots to be staged in a particular sequence at the order processing area. In some embodiments, the particular sequence can be based on the order that includes the first sellable unit and a plurality of other orders, and the plurality of other mobile robots can transport sellable items to fill the plurality of other orders.

In another aspect, this disclosure is directed to an order fulfillment system that includes: (i) a plurality of static storage units consolidated in an area, each static storage unit defining multiple storage locations, each storage location configured to receive and store a sellable unit container; (ii) a plurality of robotic actuators, each robotic actuator arranged and operable to access the multiple storage locations of one or more of the static storage units; (iii) a plurality of mobile robots, each mobile robot configured to receive and transport a sellable unit container; and (iv) a control system operable to control the plurality of robotic actuators; and control the plurality of mobile robots.

Such an order fulfillment system may optionally include one or more of the following features. The static storage units may be or include racks or shelves with multiple vertical levels. In some embodiments, one or more of the robotic actuators is/are suspended from a respective rail and traverse along the respective rail. In some embodiments, one or more of the robotic actuators is/are mounted to a floor and traverse along the floor. The control system may also be operable to determine a particular sequence in which multiple ones of the mobile robots are staged at an order processing area. The control system may also be operable to output instructions to transfer one or more sellable units from one or more sellable unit containers into an outbound container. In some embodiments, one or more of the robotic actuators is/are arranged and operable to access two static storage units that are spaced apart from each other.

The systems and processes described here may be used to provide one or more of the following optional benefits. First, some embodiments provide an order fulfillment process that is more responsive and agile so orders can be shipped to internal and external customers in a shorter timeframe than current processes. Such a result can be accomplished, for example, through optimizing material flow by reducing material handling, storage, and delays. Second, inventory carrying costs can be reduced by the added efficiencies provided by the systems and processes described herein. Third, the accuracy of order fulfillment processes can be enhanced by eliminating human errors using the automated systems and processes described herein. Fourth, labor costs associated with the order fulfillment processes can be reduced using the automated systems and processes described herein. Fifth, warehouse space requirements can be reduced using the automated systems and processes described herein.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes, such as warehouse automation and methods of controlling material flow that can be used to streamline the order fulfillment processes. For example, according to some embodiments described herein, the inventory capacity of an order sortation process is enhanced by vertically expanding the storage space that is readily accessible to mobile robots that facilitate the order sortation process. In result, the handling of inventoried items is reduced, and the efficiency of order fulfillment processes is increased.

Figure 1:
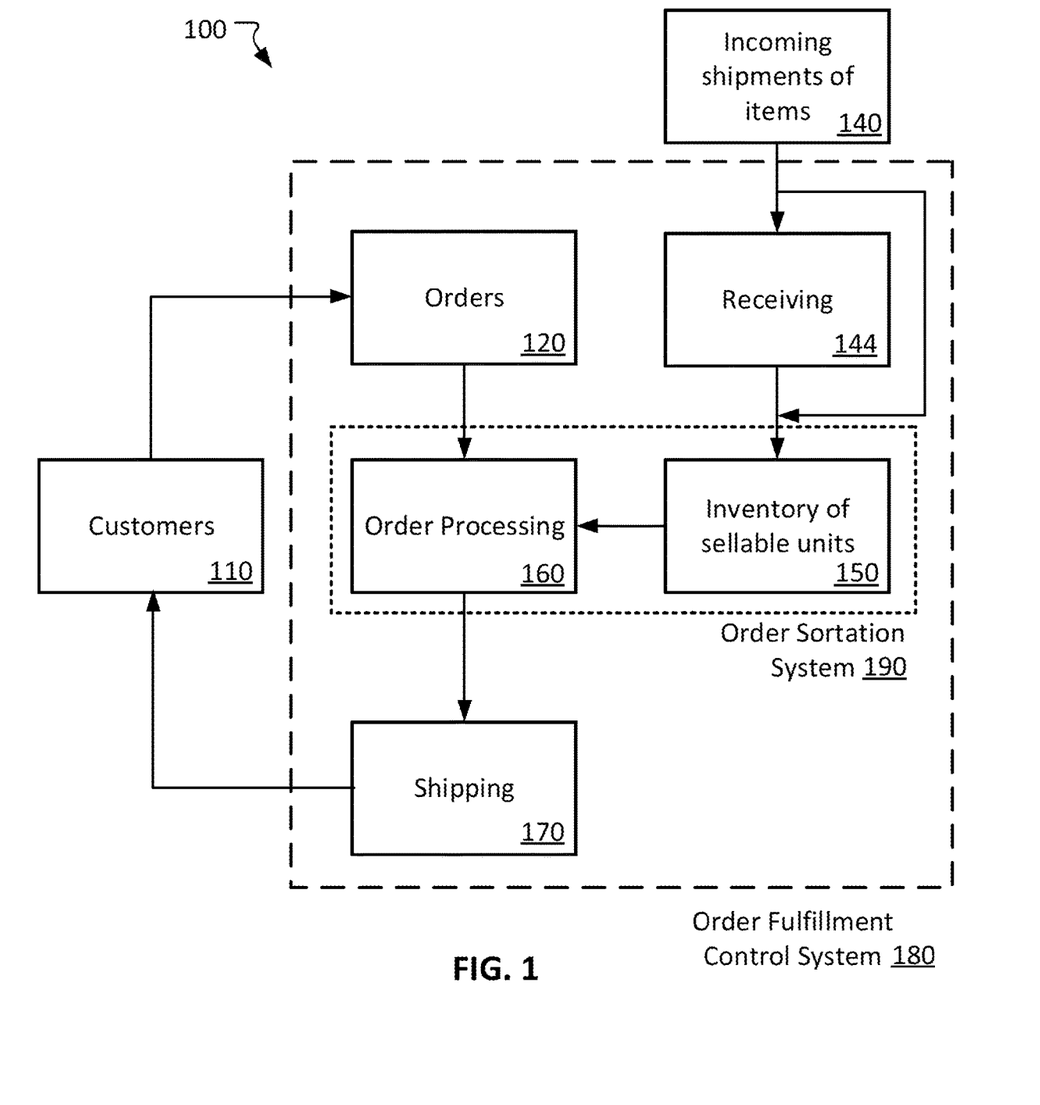
FIG. 1 is a highly-simplified schematic diagram of a basic order fulfillment process.

FIG. 1 depicts a highly-simplified schematic diagram illustrating an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in an efficient, timely, and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of sellable items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into storage inventory 150 of the flow center as sellable units. In some cases, some incoming items go directly from receiving 144 into storage inventory 150 (e.g., if the incoming items were transferred in from an affiliated facility at which the items were already accounted for in the inventory system). The types and quantities of the incoming sellable items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in storage inventory 150 can be contained in various types of storage accommodations such as racks, shelves, containers, vessels, carts, bins, totes, pallet lanes, and the like. Such storage accommodations can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various containers or receptacles such as, but not limited to, boxes, totes, pallets, baskets, bins, bags, and the like.

Next, in the step of order processing 160, the sellable item(s) included in the customer order 120 are compiled in preparation for shipment to the respective customer 110. To fulfill the customer orders 120, the one or more items specified in each order may be retrieved from storage inventory 150. Retrieved sellable items may be transported, delivered or conveyed to one or more order processing areas in the flow center for sorting and assembling into one or more outbound shipping containers for the fulfillment of a respective customer order 120. Outbound shipping containers containing the ordered sellable items are then transported to customers 110 at the step of shipping 170.

The combination of the storage inventory 150 and the order processing 160 areas can be referred to as an order sortation system 190. In some embodiments, mobile robots are used to automate the order sortation system 190. For example, in some embodiments mobile robots are used to automate the transfer ordered sellable items from storage inventory 150 to the order processing area 160 in an efficient manner.

Order fulfillment process 100 includes the daily replenishment and movement of inventory generated from real-time demand singles for in-store retail sales and direct-to-customer on-line sales fulfilled from a multi-echelon inventory holding model at the correct unit of measure, using fast and easy material handling equipment that will create operational efficiency at every process step in the supply chain. It should be understood that order fulfillment process 100 allows multiple types of orders 120 to be processed and fulfilled using the same (or essentially the same) order fulfillment process 100. For example, direct-to-customer shipments, store replenishment orders, customer pick-up-at-store orders, forward deployment of inventory shipments, inventory transfers (e.g., proactive inventory transfers, reactive inventory transfers), and the like can be processed and fulfilled using essentially the same order fulfillment process 100. Hence, the order fulfillment process 100 can be considered as a type of omni-channel order fulfillment process.

FIG. 1 and the foregoing description of the order fulfillment process 100 has provided a high-level overview of the operations of a flow center. Next, in reference to FIG. 2, additional detail focused particularly on the steps of inventory of sellable units 150 and order processing 160 will be provided.

Figure 2:
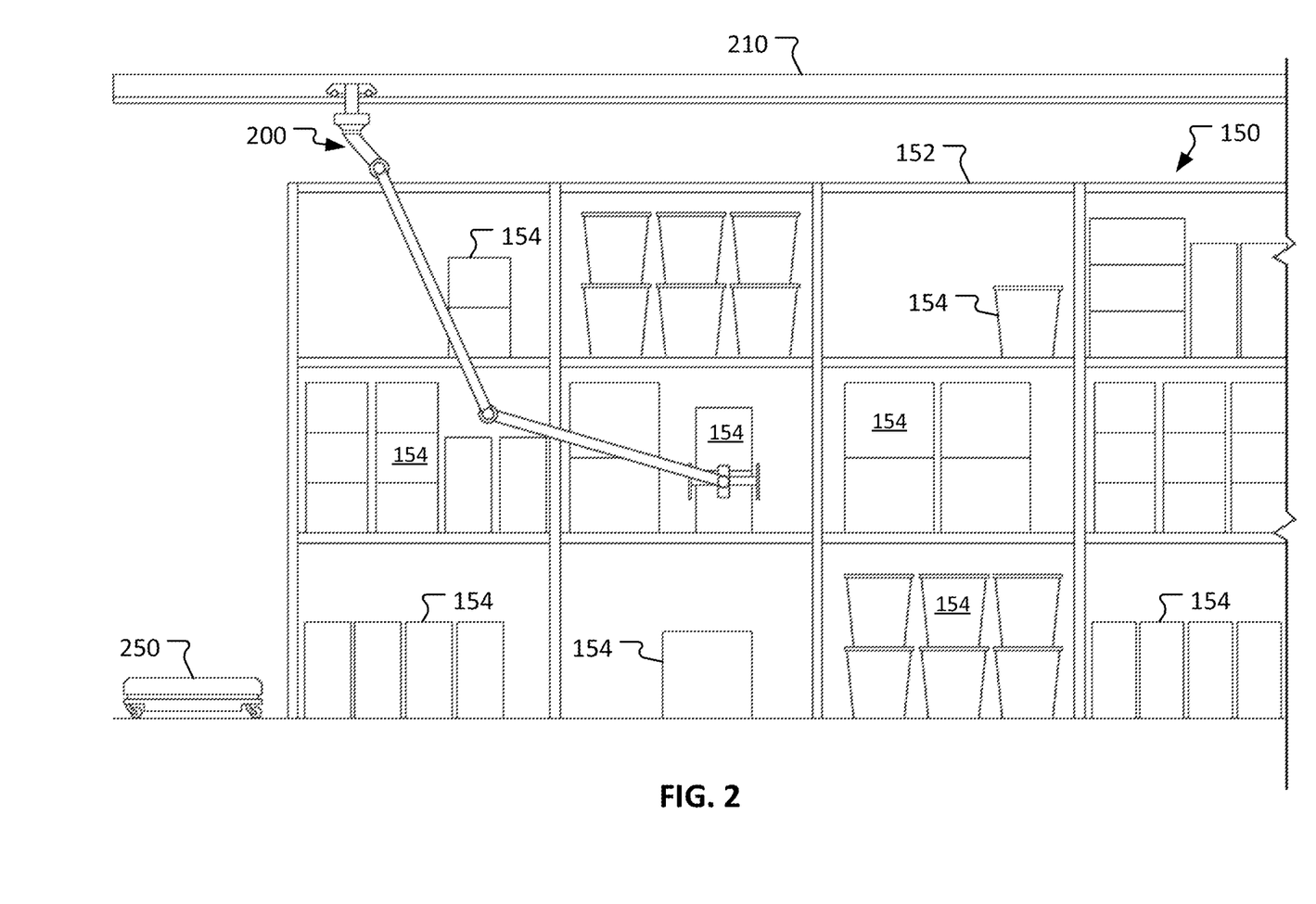
FIG. 2 is an elevation view of a static inventory storage unit and a robotic actuator that is arranged to access sellable unit containers being stored in locations of the static inventory storage unit.

Referring also to FIG. 2, an elevation view depicting an inventory of sellable units 150 in accordance with some embodiments is illustrated. In the depicted embodiment, the inventory of sellable units 150 comprises a static storage unit 152 that defines multiple storage locations. Sellable unit containers 154 are located in the storage locations defined by the static storage unit 152. In some cases, a single sellable unit container 154 is contained within a respective single storage location defined by the static storage unit 152. In some cases, two or more sellable unit containers 154 are contained within a respective single storage location defined by the static storage unit 152.

The depicted static storage unit 152 can represent any type of storage unit including, but not limited to, racks, shelves, rolling-shelves, carts, bins, totes, pallet lanes, flow-through racks, containers, vessels, and the like, and combinations thereof. The static storage unit 152 is configured to densely store the inventory of sellable units 150. In some embodiments, such as the depicted embodiment, the static storage unit 152 defines multiple vertical levels of storage locations. Accordingly, the static storage unit 152 facilitates three-dimensional storage of sellable unit containers 154.

The depicted sellable unit containers 154 can represent any type of container including, but not limited to, boxes, totes, pallets, baskets, bins, bags, and the like, and combinations thereof. In some embodiments, no particular container is used, but rather the sellable unit itself (or multiples thereof) is stored in a storage location of the static storage unit 152. The sellable unit containers 154 can contain a single sellable unit, multiple sellable units of the same type, or multiple sellable units of two or more differing types. That is, the sellable unit containers 154 can be stocked in a homogeneous manner or in a heterogeneous manner. That is, in some cases, but not exclusively, the inventory storage locations can be used to store a single sellable unit container 154 that is a homogeneous sellable unit container 154 (e.g., a tote or box containing one and only one type of sellable unit). Alternatively, in some cases, a single sellable unit container 154 that is stored in the inventory storage location is a heterogeneous sellable unit container 154 (e.g., a tote or box containing two or more different types of sellable units that are divided from each other by a physical barrier). In some cases, such heterogeneous sellable unit containers 154 may contain two or more different types of sellable units that are not divided from each other by a physical barrier. In some cases, one or more of the sellable unit container 154 is/are used to hold multiple sellable items that have been decanted from a vendor's original full case packaging. In other cases, one or more of the sellable unit container 154 can be used to hold one or more original full case packages of a vendor (each full case package holding a quantity of one or more sellable items), and orders 120 for one or more full cases of one or more items can thereby be fulfilled.

The sellable unit containers 154 stored in the storage locations of the static storage unit 152 are accessible by a robotic actuator 200. That is, the robotic actuator 200 is arranged and operable to access the storage locations of the static storage unit 152 and to engage with a sellable unit container 154 stored therein (e.g., in response to control commands initiated by a control system). After engaging with a sellable unit container 154, the robotic actuator 200 can transfer the sellable unit container 154 to a mobile robot 250. Then, the mobile robot 250 can transport the sellable unit container 154 to another area, such as, but not limited to, an order processing area (e.g., in response to control commands initiated by the control system 180).

It should be understood that the reverse process can be used to stow sellable unit containers 154 into the static storage unit 152. That is, the mobile robot 250 can transport a sellable unit container 154 to nearby the static storage unit 152, and the robotic actuator 200 can transfer the sellable unit container 154 from the mobile robot 250 to a particular storage location of the static storage unit 152.

In the depicted embodiment, the robotic actuator 200 is suspended from an overhead rail 210. The robotic actuator 200 can autonomously travel or traverse along the rail 210 (e.g., in response to control commands initiated by the control system 180), and then adjust its orientation so that it can releasably couple with a sellable unit container 154 at any of the storage locations of the static storage unit 152 (e.g., in response to control commands initiated by the control system 180).

In some embodiments, the robotic actuator 200 is mounted to a floor and the robotic actuator 200 traverses along the floor in front of the static storage unit 152. In some embodiments, other types of arrangements are used for the robotic actuator 200 (e.g., the robotic actuator 200 can be mounted to a trolley, cart, framework, or directly to the static storage unit 152, and the like). In particular embodiments, a single robot actuator 200 can access the storage locations of two or more static storage units 152 that are spaced apart from each other (e.g., across an aisle from each other).

The depicted arrangement of the inventory of sellable units 150 stored in the static storage unit 152, along with the robotic actuator 200 that can access the sellable unit containers 154 and transfer them to the mobile robot 250, can provide a significant storage capacity of sellable units 150 that are autonomously available to and accessible by the mobile robot 250. The storage capacity of sellable units 150 that are autonomously available to and accessible by the mobile robot 250 is much greater than a two-dimensional storage field of sellable unit containers 154 (as used in some implementations of mobile robots).

Figure 3:
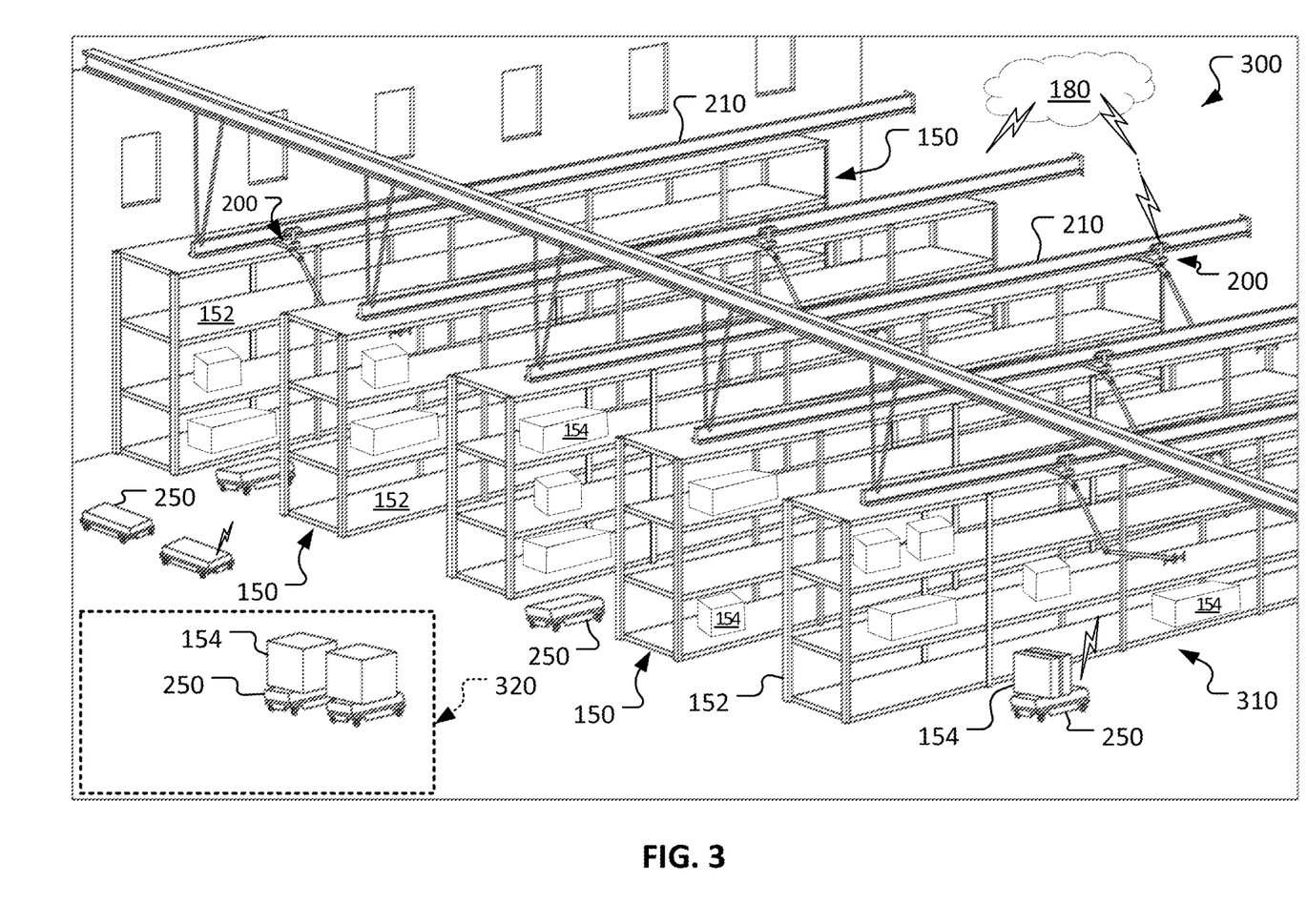
FIG. 3 is a perspective view of a plurality of static storage units and corresponding robotic actuators situated adjacent to an order processing area.

Referring also to FIG. 3, it should be understood that the arrangement of the inventory of sellable units 150 stored in static storage units 152, along with robotic actuators 200 that can access the sellable unit containers 154 and transfer them to mobile robots 250 (as depicted in FIGS. 2 and 3), is scalable to virtually any desired magnitude of size/capacity. For example, in some embodiments an order fulfillment system 300 can include a plurality of static storage units 152 that can be consolidated in an inventory storage area 310. A plurality of robotic actuators 200 can be provided as part of the order fulfillment system 300, such that one or more robotic actuator(s) 200 is/are arranged and operable to access the multiple storage locations of one or more of the static storage units 152. A plurality of mobile robots 250 can be provided as part of the order fulfillment system 300 such that the mobile robots 250 can receive sellable unit containers 154 from the robotic actuators 200 and transport the sellable unit containers 154 to another area, such as an order processing area 320 (and/or other areas).

In some embodiments, the order fulfillment system 300 also includes the control system 180. The control system 180 can, for example, wirelessly communicate with, and control, the robotic actuators 200 and the mobile robots 250 to execute the transfer of sellable items between the inventory storage area 310 and the order processing area 320 (e.g., to compile one or more types of sellable items in an outbound container for an order 120 to be shipped). In some embodiments, the control system 180 outputs instructions pertaining to the compilation or sortation of the one or more types of sellable items in an outbound container for an order 120 to be shipped. Such outputted instructions can be implemented manually (e.g., by one or more human workers), automatically (e.g., by one or more automated systems), or in combinations of manually and automatically.

In some embodiments, the control system 180 outputs control commands to a plurality of the mobile robots 250 resulting in the staging of the plurality of mobile robots 250 in a particular sequence at the order processing area 320. In that fashion, the compilation (or sortation) of ordered sellable units for one or more particular orders 120 can be performed in an efficient manner at the order processing area 320.

The outbound shipments prepared at the order processing area can be for various types of purposes such as, but not limited to, a direct ship-to-customer order, a store replenishment order, a pre-emptive placement of inventory order (e.g., to another flow center, to a backroom of a store as forward-deployed inventory, etc.), and the like. In some cases, a store replenishment order or pre-emptive placement of inventory order can be responsive to a customer sale at a store. Accordingly, such an order can be a real-time, demand-based order. It should be understood that the order fulfillment system 300 facilitates, in a consolidated manner, the fulfillment of ship-to-customer orders, the fulfillment of store replenishment orders, the fulfillment of customer pick-up-at-store orders, the fulfillment of forward deployment of inventory shipments, the fulfillment of inventory transfers, and the like, using the same fulfillment systems and processes.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. An order fulfillment system, comprising:
    a plurality of static storage units consolidated in an area, each static storage unit defining multiple storage locations, each storage location configured to receive and store a sellable unit container;
    a plurality of overhead rails in fixed locations that are spaced above the plurality of static storage units;
    a plurality of robotic actuators, each robotic actuator arranged and operable to travel along a respective overhead rail of the plurality of overhead rails and to access the multiple storage locations of one or more of the static storage units, wherein each of the robotic actuators is suspended from the respective overhead rail; and
    a control system operable, in response to receiving an order that includes demand for a first sellable unit, to:
        cause a first robotic actuator to access a first storage location of a first static storage unit and to couple with a first sellable unit container stored in the first storage location, wherein the first sellable unit container contains one or more of the first sellable units; and
        cause the first robotic actuator to place the first sellable unit container at a designated location.

2. The order fulfillment system of claim 1, wherein the static storage units comprise racks or shelves with multiple vertical levels.

3. The order fulfillment system of claim 2, wherein the racks or shelves are rolling-shelves.

4. The order fulfillment system of claim 1, wherein the static storage units comprise carts.

5. The order fulfillment system of claim 1, wherein the order also includes demand for a second sellable unit, and wherein the control system is also operable, in response to receiving the order, to:
    cause a second robotic actuator to access a second storage location of a second static storage unit and to couple with a second sellable unit container stored in the second storage location, wherein the second sellable unit container contains one or more of the second sellable units;
    cause the second robotic actuator to place the second sellable unit container at a second designated location.

6. The order fulfillment system of claim 5, wherein the control system is also operable, in response to receiving the order, to output instructions to transfer at least one of the first sellable units into an outbound container and to transfer at least one of the second sellable units into the outbound container.

7. The order fulfillment system of claim 6, wherein the instructions comprise a particular sequence for loading the outbound container with sellable units.

8. The order fulfillment system of claim 7, wherein the particular sequence is based on an efficient technique for stocking shelves of a retail store.

9. A method for responding to an order that includes a first sellable unit, the method executed by a control system in response to receiving the order and comprising:

causing a first robotic actuator of a plurality of robotic actuators to access a first storage location of a first static storage unit of a plurality of static storage units and to couple with a first sellable unit container stored in the first storage location, wherein each robotic actuator of the plurality of robotic actuators is arranged and operable to travel along a respective overhead rail of the plurality of overhead rails, wherein the plurality of overhead rails are in fixed locations that are spaced above the plurality of static storage units, wherein each of the robotic actuators is suspended from the respective overhead rail, and wherein the first sellable unit container contains one or more of the first sellable units; and causing the first robotic actuator to transfer the first sellable unit container to a designated location.

10. The method of claim 9, wherein the order also includes a second sellable unit that differs from the first sellable unit, and wherein the method further comprises:

causing a second robotic actuator to access a second storage location of a second static storage unit and to couple with a second sellable unit container stored in the second storage location, wherein the second sellable unit container contains one or more of the second sellable units;

causing the second robotic actuator to transfer the second sellable unit container to a second designated location.

11. The method of claim 10, further comprising:

outputting instructions to transfer at least one of the first sellable units into an outbound container and to transfer at least one of the second sellable units into the outbound container.

12. The method of claim 11, wherein the instructions comprise a particular sequence for loading the outbound container with sellable units.

13. The method of claim 12, wherein the particular sequence is based on an efficient technique for stocking shelves of a retail store.

14. An order fulfillment system, comprising:

a plurality of static storage units consolidated in an area, each static storage unit defining multiple storage locations, each storage location configured to receive and store a sellable unit container;

a plurality of overhead rails in fixed locations that are spaced above the plurality of static storage units;

a plurality of robotic actuators, each robotic actuator arranged and operable to travel along a respective overhead rail of the plurality of overhead rails and to access the multiple storage locations of one or more of the static storage units, wherein each of the robotic actuators is suspended from the respective overhead rail; and a control system operable to control the plurality of robotic actuators.

15. The order fulfillment system of claim 14, wherein the static storage units comprise racks or shelves with multiple vertical levels.

16. The order fulfillment system of claim 15, wherein the racks or shelves are rolling-shelves.

17. The order fulfillment system of claim 14, wherein the static storage units comprise carts.

18. The order fulfillment system of claim 14, wherein the control system is operable to control the plurality of robotic actuators to:

couple with sellable unit containers stored in the plurality of static storage units; and place the sellable unit containers at designated locations.

19. The order fulfillment system of claim 14, wherein the control system is also operable to output instructions to transfer one or more sellable units from one or more sellable unit containers into an outbound container.

20. The order fulfillment system of claim 14, wherein each robotic actuator is arranged and operable to access two static storage units that are spaced apart from each other.

* * * * *